Sept. 3, 1929.  E. C. BRULL  1,726,977
WHIPPING DEVICE
Filed Jan. 12, 1925
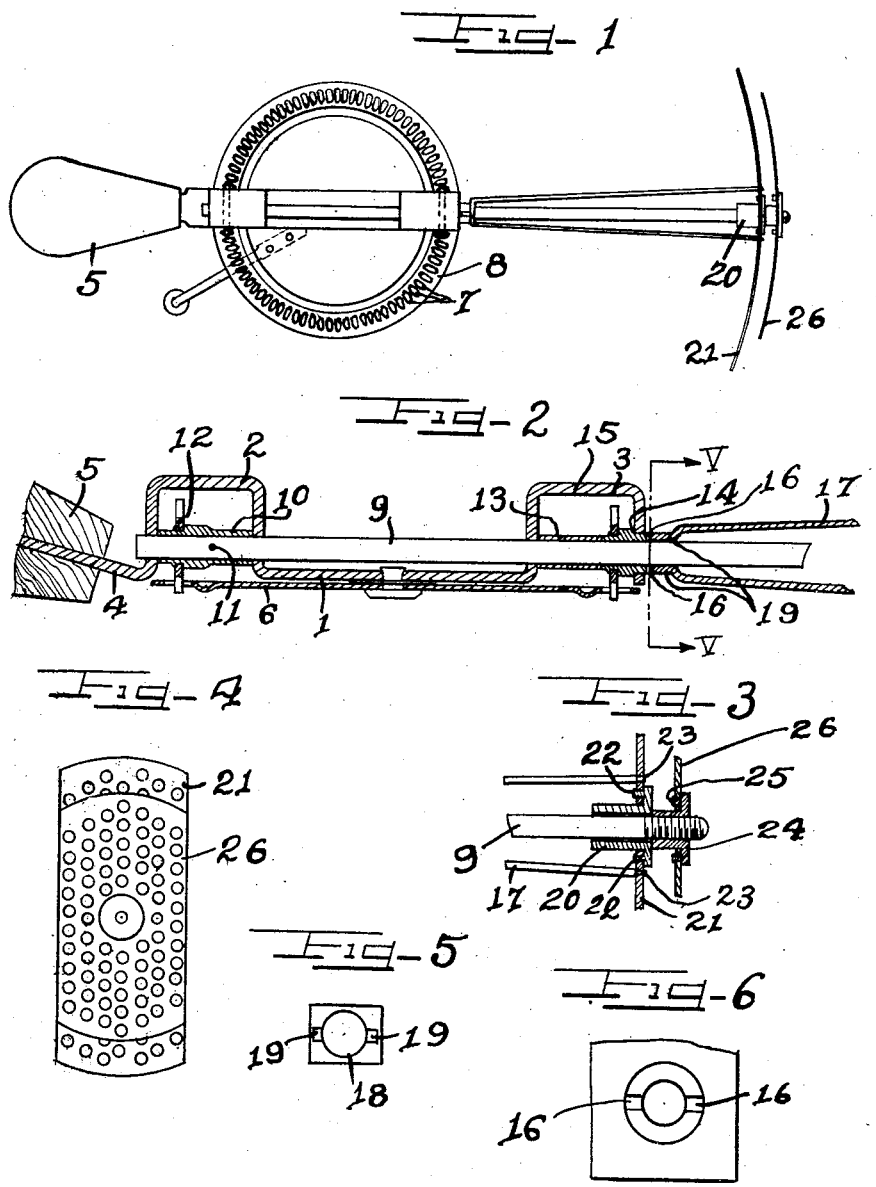
Inventor
Eugene C. Brull Patented Sept. 3, 1929.

1,726,977

UNITED STATES PATENT OFFICE.

EUGENE C. BRULL, OF OAK PARK, ILLINOIS.

WHIPPING DEVICE.

Application filed January 12, 1925. Serial No. 1,746.

This invention relates to whipping devices in general and to cream and egg whippers in particular, and is an improvement upon the construction disclosed in my prior Patent No. 1,322,874 of November 25, 1919.

It is an object of this invention to provide a structure surrounding the lower portion of the agitating shaft which will support and drive one of the agitators but which is not subject to the accumulation of matter therein.

It is also an object of this invention to provide, in a device of this class, a pair of flexible blades which rotate in opposite directions about a common axis.

It is also an object of this invention to provide such a structure which may be easily taken apart for cleaning.

It is also an object of this invention to provide a device of this class which may be economically manufactured, is rugged and may be easily kept in condition for use.

It is also the object of this invention to provide a device of this class which may be easily and conveniently operated.

With the above and other objects in view, as will be apparent, this invention consists in the construction, combination, and arrangement of parts, all as hereinafter more fully described, claimed and illustrated in the accompanying drawings.

On the drawings:

Figure 1 is a plan view of the device.

Figure 2 is a horizontal sectional view of a portion of Figure 1.

Figure 3 is a horizontal section of a portion of Figure 1.

Figure 4 is an end view of the device showing the whipper plates.

Figure 5 is a section at the line 5—5 as shown in Figure 2.

Figure 6 is a detail view of part of the device.

As shown on the drawings:

The device comprises a frame member 1 which is shaped to form yokes 2 and 3 and a portion 4 for securing a handle 5 thereto. Rotatably mounted on the frame member 1 is a gear plate 6 having slots 7 stamped therefrom. The slots 7 are equally spaced adjacent the periphery of the plate 6, leaving between said slots, ribs 8 which function as gear teeth. The yokes 2 and 3 are apertured to receive therethrough a shaft 9. Mounted on the shaft 9 within the yoke 2 is a sleeve 10. The sleeve 10 is fixed to the shaft 9 by means of a pin 11 extending through said sleeve and said shaft. A spur gear 12 is swaged on the sleeve 10, said spur gear being adapted to engage the ribs 8 of the plate 6 in the slots 7 therein. A sleeve 13 is rotatably mounted on the shaft 9 within the yoke 3, the yoke 3 being constructed to permit the sleeve 13 to extend therethrough at the right hand edge as viewed in Figure 2, a shoulder 14 on said sleeve 13 abutting the right hand portion of said yoke 3. A second spur gear 15 is swaged on the sleeve 13 and is adapted for engagement with the plate 6 in the same manner as the gear 12. The sleeve 13 has extending from the right hand end thereof as viewed in Figure 2, a pair of slots 16, Figure 6 showing an end view of the sleeve 13 and slots 16 therein. A yoke member 17 having an aperture 18 and upwardly stamped lugs 19 thereon is adapted to be received over the right hand end of the shaft 9 as viewed in Figure 2, the lugs 19 thereon being adapted to engage in the slots 16 of the sleeve 13, thus effecting a clutching engagement between members 13 and 17. A collar 20 is rotatably mounted on the shaft 9 as viewed in Figures 1 and 3 and is adapted to receive thereon a flexible elongated disk or blade 21, studs 22 integral with the collar 20, being stamped therefrom, secure the flexible member 21 to said collar 20. The ends 23 of the yoke 17 are secured to the member 21 on either side of the collar 20. The end of the shaft 9 is threaded for engagement thereon with the collar 24. Studs 25 are formed on the collar 24 in the same manner as the studs 22 are formed on the collar 20. A second elongated flexible plate or blade 26 is secured to the collar 24 by means of the studs 25 thereon. The longest diameter of the plate 26 is preferably somewhat less than that of plate 21. The operation is similar to that of my above mentioned prior patent except that this device is much easier to keep in condition for use. In addition it will be noted that from the manufacturer's point of view as well as that of the user's, the device has been greatly improved. It is further to be noted that by providing two flexible plates instead of one, as heretofore, the operation of whipping is greatly expedited. Attention is invited to the fact that by eliminating the sleeve in my prior patented device and substituting therefor the yoke member 17, I have obtained a device which may be more easily cleaned and have avoided the trouble incurred by the accumulation of matter within said sleeve.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

In a device of the class described, a rotatable shaft, a collar removably secured on one end of the shaft, the collar having lugs thereon, another collar slidably mounted on the shaft, the last-named collar having lugs thereon, a pair of perforated flexible oblong arcuate agitators mounted on the collars and in engagement with the lugs thereon, a sleeve rotatably mounted on the shaft having integral depending arms engaging one of the agitators, and means for revolving the shaft and the sleeve simultaneously in opposite directions.

In testimony whereof I have hereunto subscribed my name.

EUGENE C. BRULL.